Oct. 8, 1968    R. J. N. DEMERS    3,404,519
AUTOMATIC CLOSURE FOR SELF-PROPELLED ROTARY MOWERS
Filed Dec. 27, 1965

INVENTOR.
ROMEO J. N. DEMERS
BY
Pearson + Pearson
ATTORNEYS

United States Patent Office 3,404,519
Patented Oct. 8, 1968

3,404,519
AUTOMATIC CLOSURE FOR SELF-PROPELLED
ROTARY MOWERS
Romeo J. N. Demers, 10 Trudel Ave.,
Dracut, Mass. 01826
Filed Dec. 27, 1965, Ser. No. 517,195
5 Claims. (Cl. 56—25.4)

This invention relates to an automatically operable safety guard for covering the discharge opening of self-propelled devices such as rotary blade lawn mowers or the like.

It has heretofore been proposed to provide manually operable pivoted closures over the discharge openings of power lawn mowers, the operation of the closure not being automatic, and its use being dependent on the memory of the operator. In U.S. Patent No. 2,017,524, to Bolens of Oct. 15, 1935, a handle operated closure is provided at the front of the mower, and in U.S. Patent No. 2,578,880 to Doyle of Dec. 18, 1951, handle operated closures are provided at both front and rear of the mower. Hinged closures on a side discharge opening of a lawn mower are disclosed in U.S. Patent No. 3,032,957 to Boyer of May 8, 1962, in U.S. Patent No. 3,086,346 to Zimmerman of Apr. 23, 1963, and in U.S. Patent No. 3,077,065 to Samways of Feb. 12, 1963, but these closures do not have a manual control handle.

In modern, self propelled lawn mowers, especially of the sit down tractor type, in which the rotary blade casing has a large discharge opening at one side of the mower, there is an ever present danger that the toes of the operator will inadvertently enter the opening while he is mounting or dismounting from the tractor. There is an even greater danger that small children will congregate around a stopped tractor type mower, while the blade is revolving at high speed within the blade casing, and that the children's toes will enter the discharge opening.

The principal object of this invention, therefore, is to provide a pivoted closure covering the discharge opening of a self-propelled rotary bladed tool, there being mechanical means connecting the closure to an operating control of the tool, to open the closure only when the tool is moving over the ground.

Another object of the invention is to provide such an automatically operable closure with quick disconnect means, whereby the closure normally operates to cover the discharge opening when the tool is halted regardless of the operator, and can be arranged to remain closed when the tool is moving, if mulching is desired.

A further object of the invention is to provide a novel mechanical leverage on the pivoted guard covering a discharge opening, whereby the guard is positively actuated by a Bowden wire connected to a movable control element of the tool, the leverage assuring that the door will close against the force of any clippings being discharged through the opening.

Other objects and advantages of the invention will be apparent from the claims, the description of the drawing, and from the drawing, in which:

Figure 1:
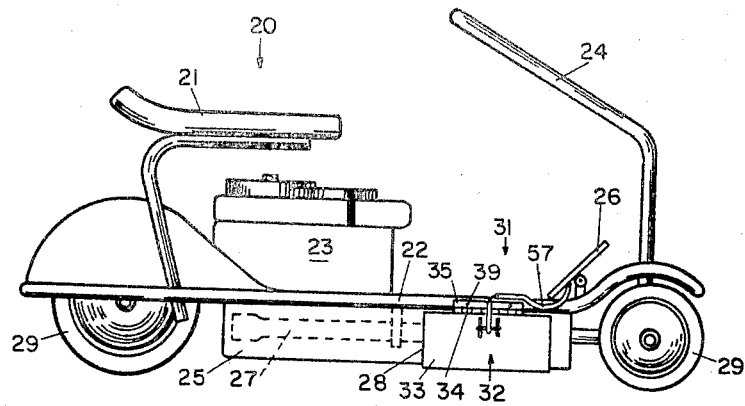
FIGURE 1 is a side elevation of a typical self propelled lawn mower having the automatically operable closure of the invention mounted thereon.

In FIGURE 1, a typical self-propelled, rotary blade tractor type lawn mower 20 is illustrated, the mower 20 having a seat 21, floor 22, motor 23, steering handle 24, and blade casing 25. It will be understood that some such mowers are equipped with a separate accelerator pedal, or handle, and a separate clutch handle, or pedal, and others may have a centrifugal clutch with only an accelerator pedal, or handle. In FIGURE 1, the accelerator pedal 26 is intended to typify any manually operable engine control element on a self-propelled device, the movement of which by the operator causes the device to move forward, or in reverse, and the retraction of which causes the machine to halt. The blade casing 25 houses the rapidly rotating cutter blade 27, which causes grass clippings to be emitted from the grass discharge opening 28 of the casing.

The grass discharge opening 28 is often of relatively large dimension, and, since it is close to the ground and in the path of the feet of an operator in mounting, or dismounting from, the mower 20, there is a danger that his toes will inadvertently enter the opening and be badly cut. When the pedal 26 is retracted to bring the mower 20 to a stop, the blade continues to rotate at high speed, and, if the operator is conversing with anyone close by the machine, especially children, the opening 28 is equally dangerous to such nearby persons. The wheels 29, and the other parts of the machine, prevent close access to the blade 27 on the front and rear, and on the side opposite from the opening 28.

It is well known to provide detachable doors which can be temporarily attached on a mower to cover the opening 28 and thereby mulch grass cuttings and leaves. It is also well known to provide doors which are hinge pivoted to a mower for covering such an opening, but such devices are not automatically operable, and the operator must remember to manually open or close the same. The usefulness of such doors in preventing accidents is thus dependent on human memory, which often tends to be faulty.

This invention provides automatic mechanical means 31, for positively assuring that the opening 28 will always be closed when the mower 20 is halted with the blade rotating, and that it will always be open when the mower 20 is moving along the ground. As shown in FIGURE 1, the means 31 includes the closure member 32, which consists of a closure plate 33, hinge pivoted as at 34 to an attachment plate 35, the plates being of thin, sheet material, such as metal.

The opening 28 differs in dimensions on various types of self-propelled lawn mowers. Closure plate 33 therefore is provided with a plurality of parallel lateral lines of weakness 36, and longitudinal lines of weakness 37, so that the outer portions, such as 38, may be broken off to conform the plate area to the area of the opening. Attachment plate 35 includes holes 39 for bolts 41, by which it is attached to the mower casing 25, above the discharge opening 28. Closure plate 33 includes a set of holes 42 for reception of one end of a coil spring 43, the other end of the spring being attached to a convenient portion of the casing 25 or to a bolt such as 44.

A pivot stud 46 is fixed to the closure plate 33 and pivotally connected by a pin 47 to the terminal end 48 of a pivot link 49. Link 49 is provided with a pivot boss 50 intermediate of the length thereof to define a long lever arm 51 and a short lever arm 52. The tip 53 of boss 50 bears against the attachment plate 35 to serve as a fulcrum, and the terminal end 54 of the shorter arm 52 has one end 55 of the wire 56 of a Bowden element 57, fixed thereto as by welding.

The flexible casing 60 of Bowden element 57 is affixed to the mower 20 at convenient locations by clips such as 61, and the other end 62 of the Bowden wire 56 is affixed to the manually operable control element 26 by means of clamp 63.

Clamp 63 includes the threaded holder 64, having suitable apertures for the wire 56 and having a wingnut clamp screw 65 for clamping the wire in position. Clamp 63 constitutes quick disconnect means, in that, if it is desired to keep the closure plate closed, when the mower is moving for mulching leaves or grass clippings, it may be loosened to temporarily break the connection of the plate to the control element.

Figure 2:
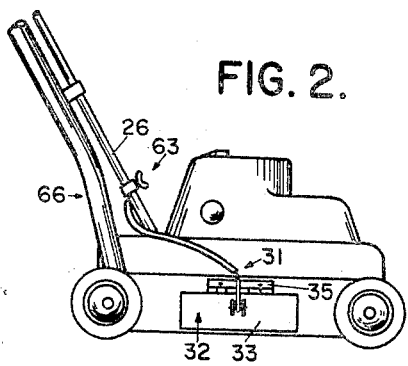
FIGURE 2 is a side elevation of another type of self propelled lawn mower having the automatically operable closure of the invention mounted thereon.
Figure 3:
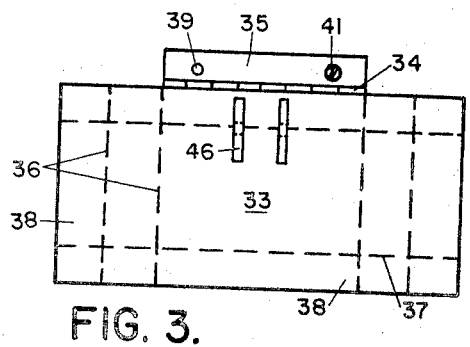
FIGURE 3 is an enlarged side elevation of the preferred form of closure plate of the invention.
Figure 4:
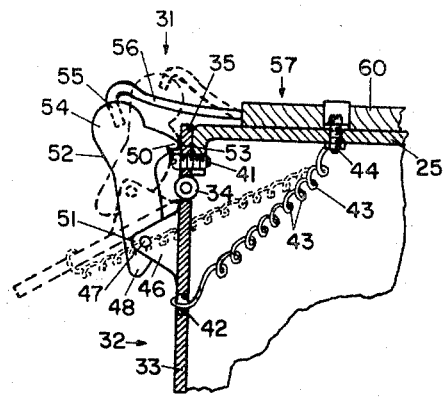
FIGURE 4 is an enlarged, fragmentary side elevation in section, showing the mechanical means of the invention.

In FIGURE 2, the automatic mechanical means 31 of the invention is illustrated as applied to a stand up type self propelled mower 66, the closure plate 33 being connected to the control element 26, which is this case is a clutch handle. When the handle is retracted to cause the mower to advance, the closure plate 33 opens and the plate 33 closes when the handle is moved downwardly into locked position.

Figure 5:
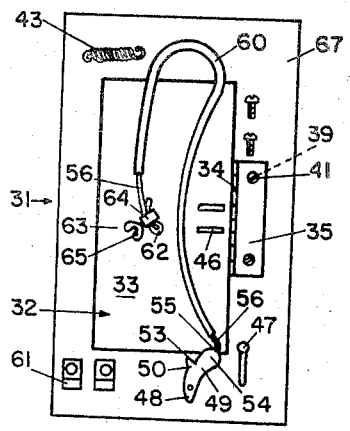
FIGURE 5 is a plan view of the device of the invention packaged as an attachment for installation on a lawn mower.

In FIGURE 5, the invention is shown in the form of an attachment for existing mowers, with all of the above named parts contained in a suitable container, such as a transparent plastic bag 67. It will be seen that the closure member 32 could be one piece and slidable in suitable ways, or slots, or could be two piece and so slidable, or could be flexible and foldable, or in the form of any well known door closure. When such a door is automatically operable by connection to a movable control of a self propelled bladed tool, it is believed to be within the scope of this invention. However, in view of the likelihood of dirt, or other material, fouling the tracks or slots of slidable doors, a hinge pivoted door is much preferable, longer lasting, and less costly.

I claim:
1. In a rotary blade power lawn mower having a grass discharge opening covered by a pivoted closure and having a manually movable engine control element for causing said mower to move forward, the combination of automatic mechanical means, permanently fixed to said mower and operably connecting said pivoted closure to said engine control element for opening said closure to permit emission of grass cuttings when said control is actuated to advance said mower, and for closing said closure to prevent entrance of the feet of the operator when said control is actuated to stop said mower.
2. A combination as specified in claim 1, wherein said automatic mechanical means includes a pivot link having one end pivotally attached to said closure, a pivot boss intermediate of the length thereof forming a fulcrum for said link, and a Bowden wire attached to the other end thereof, said wire being connected to the accelerator control of said mower.
3. A combination as specified in claim 1, wherein said automatic mechanical means includes quick disconnect means between said closure and said control element for permitting said closure to remain closed during forward movement of said mower to mulch leaves and grass cuttings.
4. A combination as specified in claim 1, wherein said closure is a flat thin plate of sheet metal having lateral and longitudinal lines of weakness impressed therein, in parallelism,
whereby outer portions of said closure may be broken off along said lines to conform said closure to the dimensions of said grass discharging opening.
5. An attachment for a self-propelled tool of the type having a rotating blade, a discharge opening adjacent the blade, and a manually operable engine control element for causing said tool to move forward, said attachment comprising
a closure member including a closure plate adapted to cover said opening, an attachment plate, a hinge pivot connecting said plates, and a pivot stud intermediate of the exterior face of said closure plate;
a pivot link having a pivot boss intermediate of the length thereof adapted to engage said attachment plate as a fulcrum, a long arm having a terminal end pivotally connected to said pivot stud and a short arm and
a Bowden element, having a casing adapted to be fixed to said tool and a wire slidable therein, said wire having one end fixed to the short arm of said link and having the other end adapted to be fixed to said control element
whereby the reciprocation of said wire causes said closure plate to automatically pivot relative to said attachment plate.

References Cited
UNITED STATES PATENTS

| | | | |
|---|---|---|---|
| 2,017,524 | 10/1935 | Bolens | 56—25.4 |
| 2,578,880 | 12/1951 | Doyle | 56—25.4 |
| 2,985,992 | 5/1961 | Dowdle | 56—25.4 |
| 2,993,329 | 7/1961 | Schmidt | 56—25.4 |
| 3,077,065 | 2/1963 | Samways et al. | 56—25.4 |
| 3,228,177 | 1/1966 | Coates | 56—25.4 |

ALDRICH F. MEDBERY, *Primary Examiner.*